F. V. GUERRA.
FENDER FOR MOTOR VEHICLES AND THE LIKE.
APPLICATION FILED NOV. 19, 1919. RENEWED SEPT. 17, 1920.

1,358,541.

Patented Nov. 9, 1920.
3 SHEETS—SHEET 1.

WITNESSES

INVENTOR
Francisco Vargas Guerra
BY
ATTORNEYS

F. V. GUERRA.
FENDER FOR MOTOR VEHICLES AND THE LIKE.
APPLICATION FILED NOV. 19, 1919. RENEWED SEPT. 17, 1920.

1,358,541.

Patented Nov. 9, 1920.

WITNESSES

INVENTOR
FRANCISCO VARGAS GUERRA
BY
ATTORNEYS

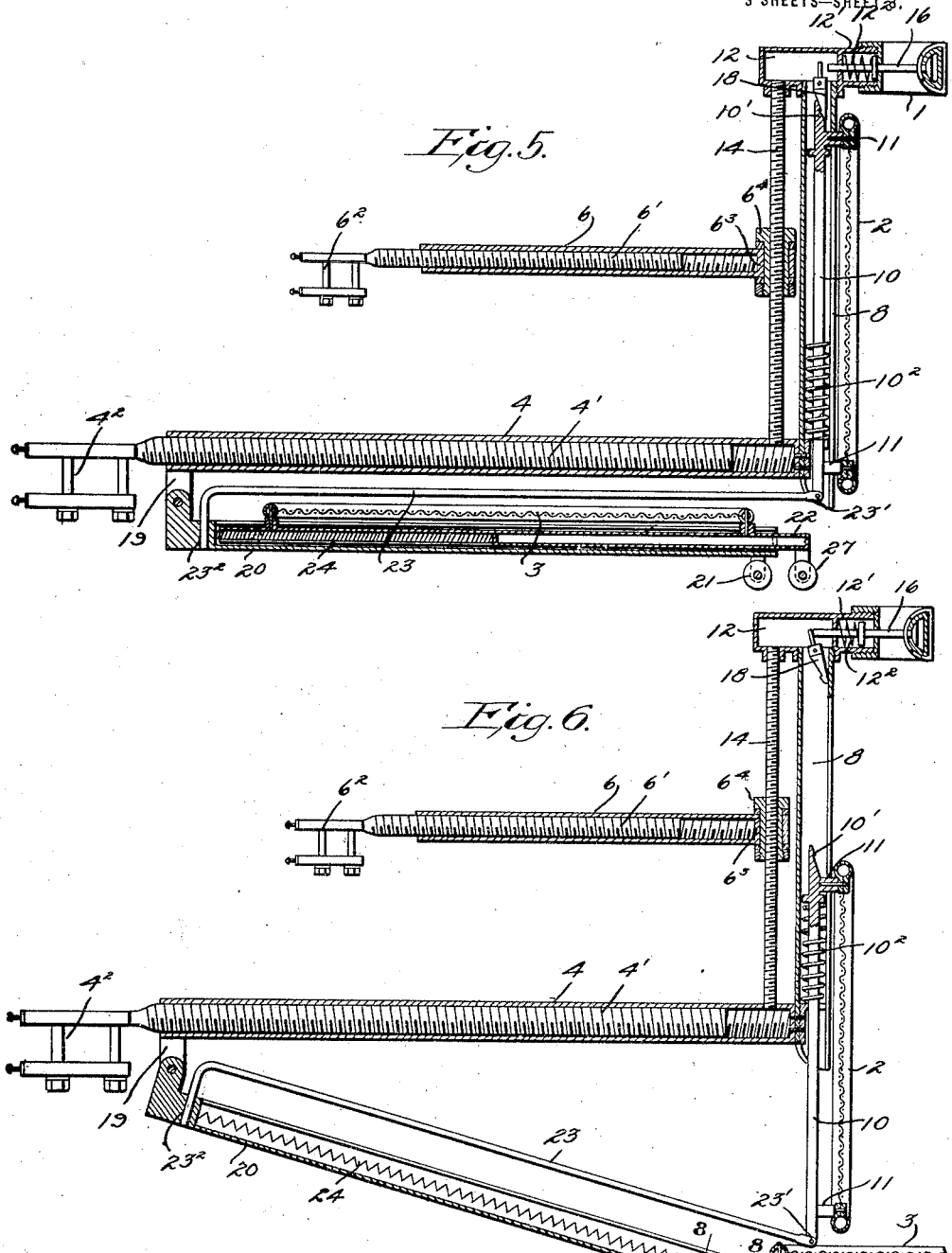

UNITED STATES PATENT OFFICE.

FRANCISCO VARGAS GUERRA, OF HABANA, CUBA.

FENDER FOR MOTOR-VEHICLES AND THE LIKE.

1,358,541. Specification of Letters Patent. Patented Nov. 9, 1920.

Application filed November 19, 1919, Serial No. 339,087. Renewed September 17, 1920. Serial No. 410,978.

*To all whom it may concern:*

Be it known that I, FRANCISCO VARGAS GUERRA, a citizen of the Republic of Cuba, and a resident of Habana, Cuba, have invented a new and Improved Fender for Motor-Vehicles and the like, of which the following is a full, clear, and exact description.

My invention relates to fenders which are used on motor vehicles, and street and railroad cars as a safeguard against injury should the vehicle or car on which the fenders are carried collide with a person.

The invention in its preferred form has reference more particularly to a fender which may be conveniently used on motor vehicles without presenting an unsightly or cumbersome structure on the front of the vehicle, to which end one feature of the invention resides in so constructing the device that the horizontal platform will normally assume an inactive position in the rear of the collision buffer but capable of being automatically brought into use by the impact of a person colliding with the said collision buffer.

Another feature of the invention is to so construct the device that it may be applied to any make of motor vehicle or street or railroad car, to which end the frame structure of the device is adjustable both longitudinally and transversely of the vehicle.

With these principal features in view the invention will be more readily understood upon reference to the accompanying drawings in which—

Fig. 5 is a longitudinal section on the line 5—5, Fig. 1;

Fig. 6 is a view similar to Fig. 5 with the horizontal platform extending in active position;

Fig. 7 is a sectional view on the line 7—7, Fig. 1 showing the collision buffer in cross section; and Fig. 8 is a view on the line 8—8, Fig. 6.

Figure 1:
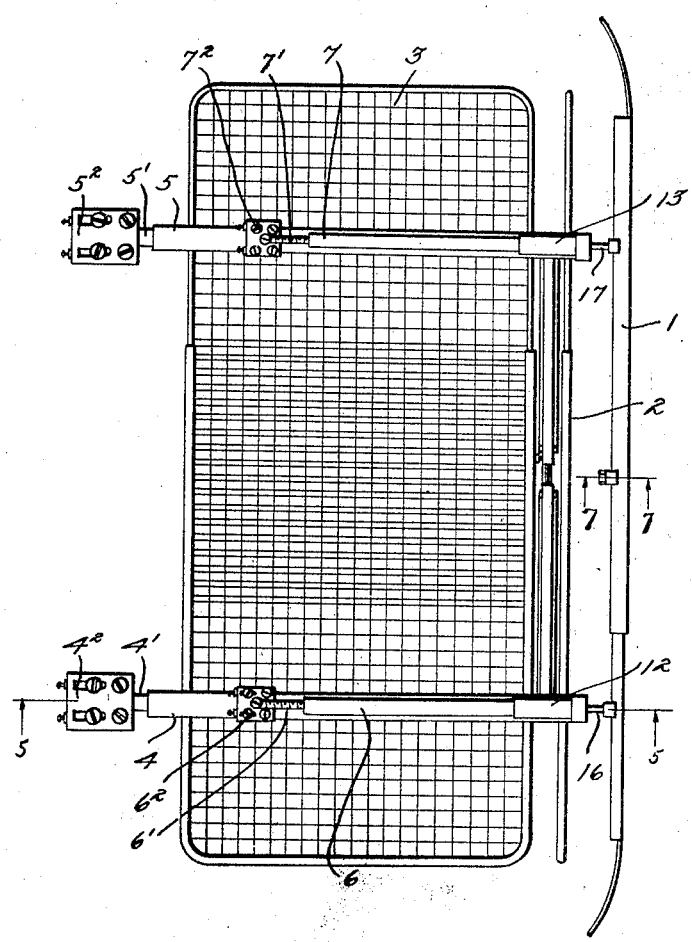
Figure 1 is a plan view of the device.
Figure 2:
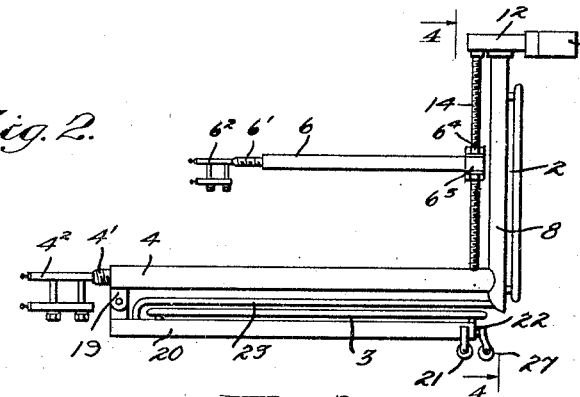
Fig. 2 is a side elevation.
Figure 3:
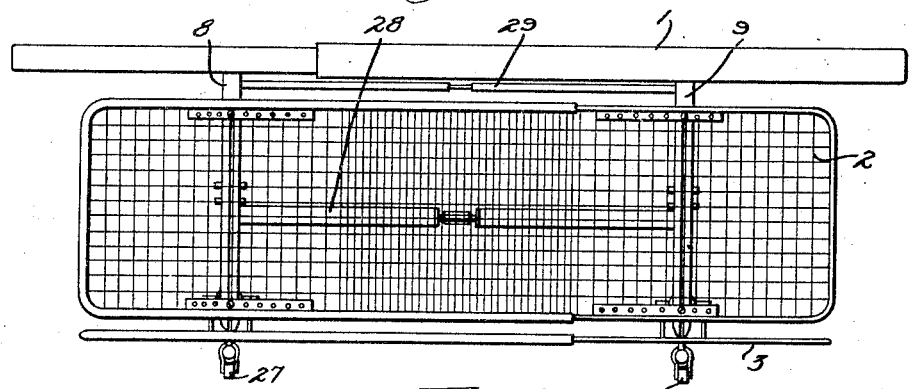
Fig. 3 is a front view.
Figure 4:
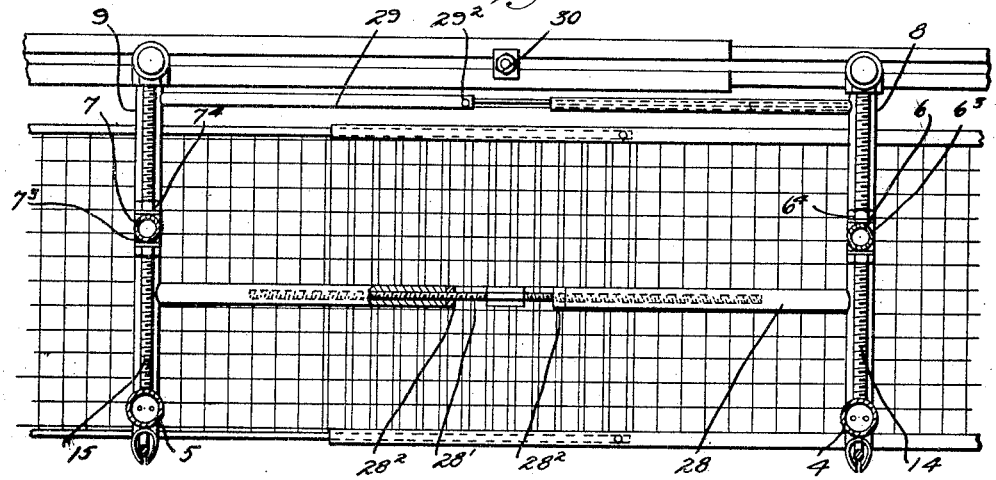
Fig. 4 is a vertical section on the line 4—4, Fig. 2.

Referring to the drawings in detail the device is composed of practically three main parts such as a collision buffer 1, a vertical guard 2 and a horizontal platform 3 all of which being mounted to a frame structure consisting of the following parts, to wit, a plurality of horizontally presented internally threaded tubular members 4, 5, 6 and 7 made to receive the threaded posts $4'$, $5'$, $6'$ and $7'$, the ends of which being provided with clamps $4^2$, $5^2$, $6^2$ and $7^2$ for mounting the device to the front of a vehicle or car as the case may be. Supported by the tubular members 4 and 5 are two vertical tubular posts 8 and 9 which are slotted and made to receive vertical rods 10 which have projections 11 protruding through the slots in the posts 8 and 9 and to which the vertical fender 2 is mounted with freedom of vertical movement. Arranged at the top of the vertical posts 8 and 9 are the housings 12 and 13 each of which is provided with a threaded opening in the bottom thereof to receive the vertical threaded posts 14 and 15 which extend to the tubular members 4 and 5 with their ends supported thereby. The ends of the tubular members 6 and 7 opposite the clamps $6^2$ and $7^2$ are provided with collars $6^3$ and $7^3$ each of which confining headed sleeves $6^4$ and $7^4$ and through the axial threaded bores of which are passed the threaded posts 14 and 15. A washer and lock nut is provided for each sleeve to lock the same, with the tubular members 6 and 7 thus capable of a wide range of vertical adjustment on the posts 14 and 15.

The front ends of the housings 12 and 13 are each partitioned off as at $12'$ with coiled springs $12^2$ confined in each partition. The collision buffer 1 is provided adjacent its opposite ends with the short rods 16 and 17 which extend rearwardly of the buffer, through the caps on the ends of the housings and through the partitions $12'$. An abutment is provided on each rod and against which the coiled springs $12^2$ are seated. Each end of the rods 10 is constructed with a claw $10'$ which is engaged by the pivoted catches 18 whereby the vertical guard 2 together with the rods 10 to which it is mounted may be hung in normal position under the collision buffer 1. The pivoted catches 18 are constructed with pins vertically presented in the path of the rods 16. It will thus be seen with impact on the buffer such as a person colliding therewith, the pins will overcome the influence of the springs and move to a position tripping the catches and releasing the rods 10 and the vertical guard 2 whereupon it will drop to extended position (see Fig. 6). The shock incident to the dropping of the guard may be absorbed by the springs $10^2$ which are confined on the rods 10.

The ends of the members 4 and 5 adjacent the clamps $4^2$ and $5^2$ are constructed with straps 19 to which is pivoted the frame of the horizontal platform 3 consisting of the tubular members 20, the free end of each having a roller 21 and the telescoping members 22 which are normally confined in the members 20 with the platform 3 which platform is carried upon the members 22 by suitable feet presented through longitudinal slots in the members 20, said feet extending above the members when the same are telescoped one within the other. The suspending means for the frame of the platform 3 comprises the rods 23 which are pivoted as at 23' to the rods 10 at one end and fixed to the tubular members 20 as at $23^2$ at their opposite ends. It will now follow when the vertical guard 2 has been dropped as above described the suspension of the horizontal platform 3 will have been released by the lowering of the pivoted end of the rods 23 whereupon the frame or the tubular members 20 of the platform 3 will be inclined downwardly permitting the springs 24 confined in the telescoping members to project the inner member 22 outwardly and forwardly with the platform 3 carried thereby, presented in active position in front of the device. To prevent complete withdrawal of the members 22 from the members 20, as well as to permit the platform to assume a horizontal position when extended, flexible joints 25 each having an interlocking engagement as at 26 are provided for connecting the members together. The forward ends of the members 22 are provided with rollers 27.

The frame is braced by the transverse brace members 28 and 29 which connect the tubular posts 8 and 9. The member 29 comprises a pair of rods with axial bores made to receive the ends of a joining rod 29' with a set screw $29^2$ for locking the joining rod in the bores of the members 29. The brace 28 is constructed with a joining rod 28' threaded in the ends of the brace members with lock nuts $28^2$ on the threaded joining rod adapted to maintain the ends of the brace members in any desired spaced relation.

The whole device is capable of longitudinal adjustment to which end the buffer 1 is made of telescoping sections with a locking device 30 for maintaining an adjustment. The side pieces of the frame structure for both the vertical guard 2 and the horizontal platform 3 is also made to telescope with pins or the like for holding the adjustment.

The longitudinal adjustment is made by the threaded engagement of the members 4, 5, 6 and 7 and 4', 5', 6' and 7'.

Having thus described my invention, what I claim as new and desire to secure by Letters Patent is:

1. In a device of the character described, a frame structure, a vertical guard, and a horizontal platform on said frame adapted to assume a normal inactive position on the front of a vehicle, means for releasing the vertical guard to active position, and means automatically actuated upon the release of the vertical guard for releasing the horizontal platform to active position in front of the vertical guard.

2. In a device of the character described, a frame structure, a collision buffer on the frame structure, a vertical guard and a horizontal platform also on the frame, means on the collision buffer for releasing the vertical guard to active position, and means automatically actuated upon the release of the vertical guard for releasing the horizontal platform to active position in front of the vertical guard.

3. In a device of the class described and in combination, a collision buffer, a vertical guard normally supported by a catch beneath said buffer, means on the buffer adapted to trip said catch upon impact of a person with the buffer for dropping the said guard to active position, a horizontal platform normally supported inactive rearwardly of the vertical guard, and means automatically actuated upon the dropping of the vertical guard for releasing the horizontal platform to active position in front of the vertical guard.

4. In a device of the class described and in combination, a collision buffer, a vertical guard normally supported by a catch beneath said buffer, means on the buffer adapted to trip said catch upon impact of a person with the buffer for dropping the said guard to active position, a horizontal platform normally supported inactive rearwardly of the vertical guard, and means automatically actuated upon the dropping of the vertical guard for releasing the horizontal platform to active position in front of the vertical guard, said collision buffer, the vertical guard and the horizontal platform being capable of transverse adjustment relative to the vehicle to which they are applied.

5. In a device of the class described and in combination, a collision buffer, a vertical guard normally supported by a catch beneath said buffer, means on the buffer adapted to trip said catch upon impact of a person with the buffer for dropping the said guard to active position, a horizontal platform normally supported inactive rearwardly of the vertical guard, a support for mounting the device to a vehicle capable of longitudinal adjustment relative thereto and said collision buffer, the vertical guard and the horizontal platform being capable of transverse adjustment relative to the vehicle.

6. In a device of the class described and as set forth in claim 5 and in which the support for mounting the device to a vehicle embodies a plurality of tubular members with posts received by said members having clamps adapted to engage the parts of the vehicle to which the device is mounted, said tubular members and said posts adapted to telescope one within the other.

7. In a device of the class described and as set forth in claim 5 and in which the support for mounting the device to a vehicle embodies a plurality of tubular members with posts received by said members having clamps adapted to engage the parts of the vehicle to which the device is mounted, said tubular members and said posts adapted to telescope one within the other, and the said vertical guard and the said horizontal platform together with the collision buffer being made up of telescoping sections.

8. In a device of the class described, a frame structure adapted to be longitudinally and adjustably supported on the front of a vehicle, a buffer on the frame, a vertical guard on the frame normally supported beneath the buffer, a horizontal frame, a horizontal platform on said horizontal frame adapted to assume an inactive position in the rear of the vertical guard, pivoted latches on the frame, a plurality of vertical rods on which said vertical guard is mounted, said rods adapted to engage said pivoted latches for normally supporting the said guard in inactive position, rods pivoted to said vertical rods with their opposite ends connecting and suspending the frame structure of the horizontal platform, and means actuated by impact of a person with the buffer for tripping said vertical rods whereby the vertical guard may drop to active position, and means for automatically presenting said horizontal platform in active position in front of said vertical guard.

9. In a device of the class described, a frame structure adapted to be longitudinally and adjustably supported on the front of a vehicle, a buffer on the frame, a vertical guard on the frame normally supported beneath the buffer, a horizontal frame, a horizontal platform on said horizontal frame adapted to assume an inactive position in the rear of the vertical guard, pivoted latches on the frame, a plurality of vertical rods on which said vertical guard is mounted, said rods adapted to engage said pivoted latches for normally supporting the said guard in inactive position, rods pivoted to said vertical rods with their opposite ends connecting and suspending the frame structure of the horizontal platform, and means actuated by impact of a person with the buffer for tripping said latches and releasing said vertical rods whereby the vertical guard may drop to active position, said frame for the horizontal platform comprising telescoping sections one of which supporting the platform through a slot in the female member of the sections, said sections adapted to be automatically released with a downward incline upon the dropping of the vertical guard whereby the female sections supporting the platform may telescope from the male sections and present the platform in active position in front of the vertical guard.

10. In a device of the character described, and as set forth in claim 8 and in which the frame of the device is capable of longitudinal and transverse adjustment relative to the vehicle to which it is applied.

11. In a device of the character described, and as set forth in claim 9 and in which the frame of the device is capable of longitudinal and transverse adjustment relative to the vehicle to which it is applied.

12. In a device of the class described, a frame structure made up of a plurality of longitudinal and transverse telescoping sections whereby said frame structure is adapted to be longitudinally and adjustably supported on the front of a vehicle, a buffer on the frame, a vertical guard on the frame normally supported beneath the buffer, a horizontal frame, a horizontal platform on said horizontal frame adapted to assume an inactive position in the rear of the vertical guard, pivoted latches on the frame, a plurality of vertical rods on which said vertical guard is mounted, said rods adapted to engage said pivoted latches for normally supporting the said guard in inactive position, rods pivoted to said vertical rods with their opposite ends connecting and suspending the frame structure of the horizontal platform, and means actuated by impact of a person with the buffer for tripping said latches and releasing said vertical rods whereby the vertical guard may drop to active position, said frame for the horizontal platform comprising telescoping sections one of which supporting the platform through a slot in the female member of the sections, said sections adapted to be automatically released with a downward incline upon the dropping of the vertical guard, whereby the female sections supporting the platform may telescope from the male sections and present the platform in active position in front of the vertical guard.

FRANCISCO VARGAS GUERRA.